US007925736B2

(12) United States Patent
Langley et al.

(10) Patent No.: US 7,925,736 B2
(45) Date of Patent: Apr. 12, 2011

(54) MESSAGE REDIRECTION WITHIN A MESSAGING INFRASTRUCTURE

(75) Inventors: Stuart J. Langley, Redmond, WA (US); Kartik Paramasivam, Redmond, WA (US); Ramasubramaniam Poornalingam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 135 days.

(21) Appl. No.: 12/484,666

(22) Filed: Jun. 15, 2009

(65) Prior Publication Data
US 2010/0318616 A1 Dec. 16, 2010

(51) Int. Cl.
*G06F 15/173* (2006.01)
(52) U.S. Cl. ............ 709/223; 709/203; 709/217; 707/3; 707/10
(58) Field of Classification Search .................. 709/203, 709/217, 219, 223, 224; 707/1, 3, 10
See application file for complete search history.

(56) References Cited

U.S. PATENT DOCUMENTS

| 6,745,197 | B2 * | 6/2004 | McDonald ............................ 1/1 |
| 6,782,542 | B1 * | 8/2004 | Mein et al. ...................... 719/330 |
| 7,055,143 | B2 * | 5/2006 | Ringseth et al. ............... 717/143 |
| 7,065,706 | B1 * | 6/2006 | Sankar .......................... 715/234 |
| 7,289,504 | B1 | 10/2007 | Hippelainen et al. |
| 7,453,875 | B2 * | 11/2008 | Vernal et al. ................... 370/389 |
| 2002/0021680 | A1 | 2/2002 | Chen |
| 2002/0184319 | A1 * | 12/2002 | Willner et al. ................ 709/206 |
| 2003/0050966 | A1 * | 3/2003 | Dutta et al. .................... 709/203 |
| 2003/0074413 | A1 * | 4/2003 | Nielsen et al. ................ 709/206 |
| 2006/0168132 | A1 * | 7/2006 | Bunter et al. .................. 709/219 |
| 2008/0263166 | A1 * | 10/2008 | Beigi et al. ..................... 709/206 |
| 2009/0138895 | A1 * | 5/2009 | Dumas et al. .................. 719/315 |
| 2009/0271495 | A1 * | 10/2009 | Allen et al. .................... 709/217 |
| 2010/0223560 | A1 * | 9/2010 | Shenfield et al. ............. 715/744 |

OTHER PUBLICATIONS

Bustamante, Michele Leroux, "Service Station", Buidling a WCF Router, Part 2, 2009, 10 pages.
Oracle Communication and Mobility Administrator Guide, "An Overview of Oracle Communication and Mobility Server", 2007, 14 pages.

* cited by examiner

*Primary Examiner* — Lashonda T Jacobs
(74) *Attorney, Agent, or Firm* — Workman Nydegger

(57) ABSTRACT

The present invention extends to methods, systems, and computer program products for redirecting client messages between hosts within a messaging infrastructure. When a host receives a client message, it can refer to lock information in a shared database to determine if it is the correct host to receive the client message. The lock information includes a redirect endpoint. The redirect endpoint identifies an endpoint where client messages can be sent for delivery to the appropriate workflow instance. The redirect endpoint can be included in a redirect fault message, that is returd to a host when a host attempts to process a client message that is already locked to another workflow instance. Using the redirect endpoint, a host receiving a redirect fault message can use the redirect endpoint to send a client message to the correct host.

20 Claims, 4 Drawing Sheets

MESSAGE REDIRECTION WITHIN A MESSAGING INFRASTRUCTURE

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, many remote users access applications and data through a centralized remote location. For example, a number of client machines can access a Web service via the Internet. In many environments, and especially for services (or other applications) with increased workload, multiple instances of the service (or application) are created to provide a better user experience. The multiple instances of the service can even be spread across a number of different computer systems, such as, for example, in a server farm.

Multiple computer system environments typically include some type of network load balancing technology to more evenly distribute workload between across instances of a service. However, many load balancing algorithms are somewhat primitive and typically do not consider message content when determining where to send a message. For example, some load balancing algorithms utilize simple round robin techniques.

Some more sophisticated load balancing algorithms attempt to insure that messages destined for the same instance of a service are delivered to the host where the service is currently loaded. Network load balancers can used different affinitization schemes, such as, session ID or client Internet Protocol ("IP") address to attempt to deliver messages to the correct host. However, some types of services, such as, for example, services that used workflows, may cause these and similar affinitization schemes to perform in a less than optimal manner.

For example, the lifetime of a workflow can exceed the time of a client session, or have many distinct clients communicating with same workflow instance. Further, workflow services can use correlation to affinitize messages to service instances. However, the data used to generate correlation keys is typically contained in a message and can not be read by a network load balancer. Additionally, auxiliary services, such as, for example, a timer service, can move workflow instances between hosts in a scale out farm. As a result, there is often no way for a network load balancer to deterministically know the correct location of a workflow instance Instead of using a separate load balancer, some systems utilize a queue that both stores messages and handles the distribution of messages to service instances. However in queue based systems, the queue is tightly coupled to the service instances. Thus, changes to the service can result in incompatibilities with the queue. Queue based systems also tend to have higher latency since the queue acts as a bottleneck to message distribution. Further, queue based systems make the use of transactions more difficult, since message delivery is tightly coupled to the queue. Additionally, queue based systems have various inefficiencies with respect to security.

BRIEF SUMMARY

The present invention extends to methods, systems, and computer program products for message redirection within a messaging infrastructure. In some embodiments, a computer system stores endpoint information for a lock owner of an instance of a workflow. A message redirector at the computer system intercepts a client message that was received at the visible messaging endpoint. The client message was received from a client computer system and directed to a service. The message redirector outputs the client message on a redirect client endpoint to send the client message to the service.

The service receives the client message on the internal service endpoint. The service sends a lock request for a new instance of the workflow. The lock request is sent to a shared database, which is shared database being shared among a plurality of computer systems in a group of computer systems that provide the server. The new instance of the workflow provides an instance of the service to the client computer system.

The service receives a lock reply from the shared database. The lock reply indicates that the service can lock a new instance of the workflow for the client computer system. The service inserts a lock entry into the shared database. The lock entry indicates that redirected client messages for the new instance of the workflow are to be sent to a redirect service endpoint. Accordingly, the lock entry provides sufficient information to other computer systems to enable the other computer systems to send client messages for the new instance of the workflow to the computer system.

In other embodiments, a computer system redirects a client message to the appropriate workflow instance. A message redirector intercepts a client message that was received at a visible messaging endpoint. The client message having been received from a client computer system and directed to the service. The message redirector outputs the client message on s redirect client endpoint to send the client message to the service.

The service receives the client message on an internal service endpoint. The service sends a lock request for a new instance of the workflow. The lock request is sent to a shared database, which is shared among the plurality of computer systems in the group of computer systems. The new instance of the workflow is to provide an instance of the service to the client computer system.

The computer system receives a lock reply from the shared database. The lock reply indicates that another workflow instance already has a lock on client messages from the client computer system. The lock reply also identifies an endpoint corresponding to the other workflow instance at another computer system in the group of computer systems. The service outputs a redirect fault, including the identified endpoint, on the internal service endpoint to send the redirect fault to the message redirector. The message redirector receives the redirect fault on the redirect client endpoint. The message redirector redirects the client message to the identified endpoint at the other computer system. The client message is redirected for delivery to the other workflow instance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
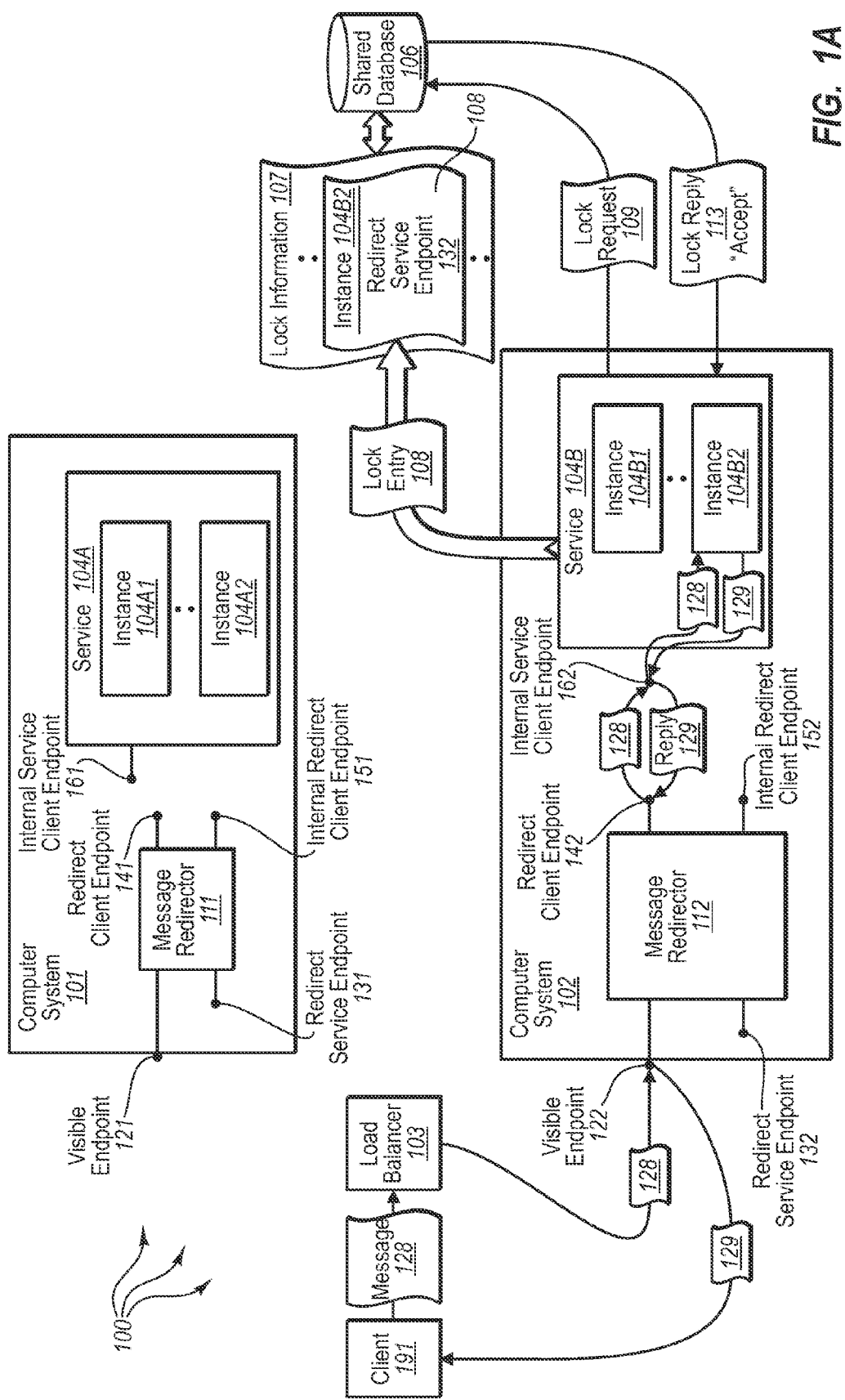
FIGS. 1A and 1B illustrate an example computer architecture 100 that facilitates message redirection within a messaging infrastructure.

The present invention extends to methods, systems, and computer program products for message redirection within a messaging infrastructure. In some embodiments, a computer system stores endpoint information for a lock owner of an instance of a workflow. A message redirector at the computer system intercepts a client message that was received at the visible messaging endpoint. The client message was received from a client computer system and directed to a service. The message redirector outputs the client message on a redirect client endpoint to send the client message to the service.

The service receives the client message on the internal service endpoint. The service sends a lock request for a new instance of the workflow. The lock request is sent to a shared database, which is shared database being shared among a plurality of computer systems in a group of computer systems that provide the server. The new instance of the workflow provides an instance of the service to the client computer system.

The service receives a lock reply from the shared database. The lock reply indicates that the service can lock a new instance of the workflow for the client computer system. The service inserts a lock entry into the shared database. The lock entry indicates that redirected client messages for the new instance of the workflow are to be sent to a redirect service endpoint. Accordingly, the lock entry provides sufficient information to other computer systems to enable the other computer systems to send client messages for the new instance of the workflow to the computer system.

In other embodiments, a computer system redirects a client message to the appropriate workflow instance. A message redirector intercepts a client message that was received at a visible messaging endpoint. The client message having been received from a client computer system and directed to the service. The message redirector outputs the client message on the redirect client endpoint to send the client message to the service.

The service receives the client message on an internal service endpoint. The service sends a lock request for a new instance of the workflow. The lock request is sent to a shared database, which is shared among the plurality of computer systems in the group of computer systems. The new instance of the workflow is to provide an instance of the service to the client computer system.

The computer system receives a lock reply from the shared database. The lock reply indicates that another workflow instance already has a lock on client messages from the client computer system. The lock reply also identifies an endpoint corresponding to the other workflow instance at another computer system in the group of computer systems. The service outputs a redirect fault, including the identified endpoint, on the internal service endpoint to send the redirect fault to the message redirector. The message redirector receives the redirect fault on the redirect client endpoint. The message redirector redirects the client message to the identified endpoint at the other computer system. The client message is redirected for delivery to the other workflow instance.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1B:
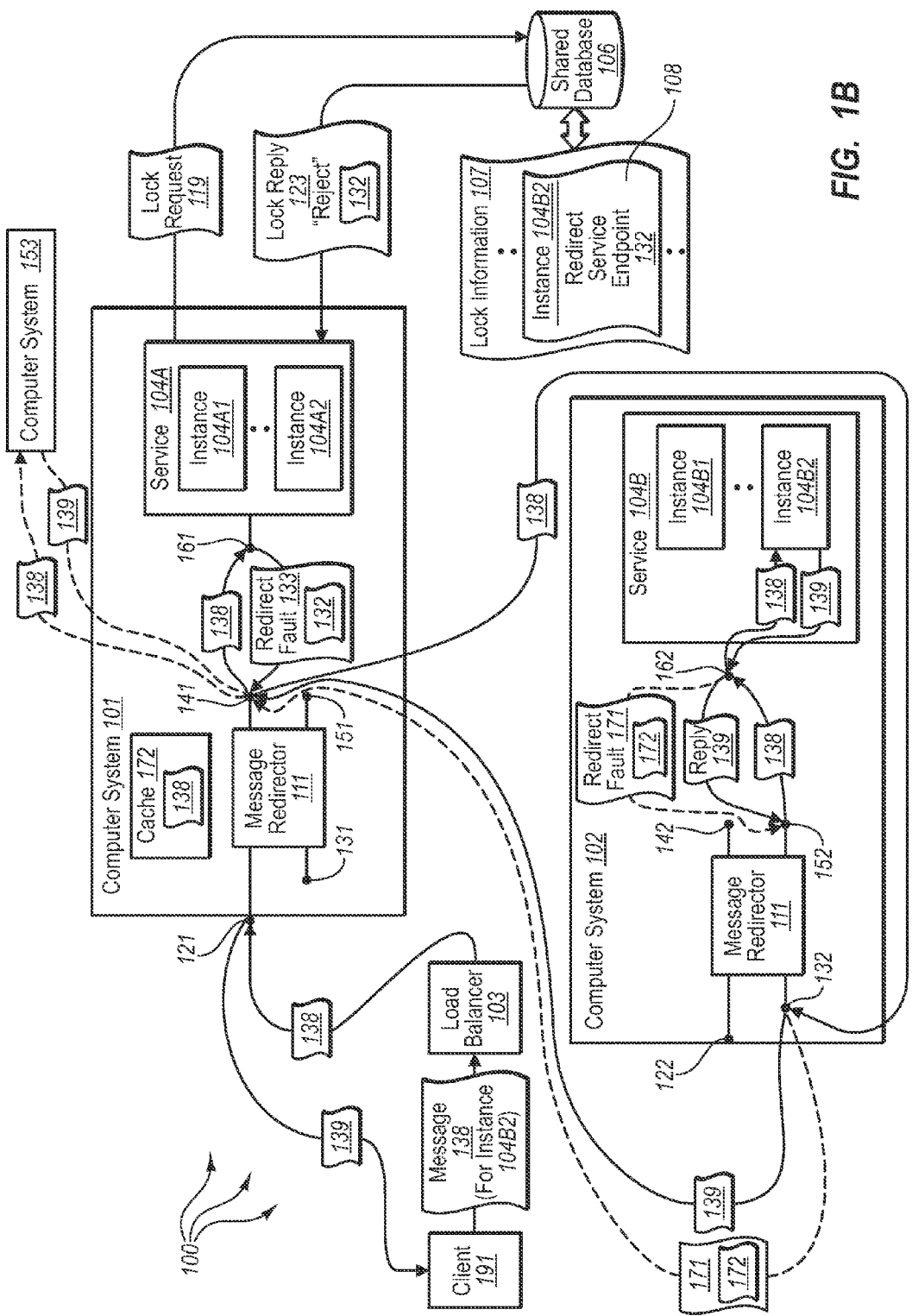

FIGS. 1A and 1B illustrates a example computer architecture 100 that facilitates message redirection within a messaging infrastructure. Referring to FIG. 1A, computer architecture 100 includes client 191, load balancer 103, shared database 106, and computer systems 101 and 102. Computer systems 101 and 102 can be included in a group of computer systems that provide service 104 (identified as service 104A, 104B, etc.) through workflow instances. Workflow instances that provide service 104 can be long running and/or stateful Web services (e.g., based on Windows Foundation ("WF") or Windows Communication Foundation ("WCF") technologies). Each of computer systems 101 and 102 can instantiate a plurality of different workflow instances so as to provide a plurality of instances of the service to client computer systems. Thus, a plurality of workflow instances can be active at any given time. For example, workflow instances 104A1 and 104A2 can be active at service 104A simultaneous to each other and simultaneous to workflow instances 104B1 and 104B2 at service 104B. A service, such as, for example, 104A and 104B, can include internal logic for transferring a received client message to the appropriate workflow instance within the service. The internal logic can refer to a session ID, client Internet Protocol ("IP") address, correlation keys, etc., when transferring a received client message to the appropriate workflow instance.

Client 191, load balancer 103, shared database 106, and the group of computer systems (including computer systems 101 and 102) are connected to one another over (or are part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., IP datagrams and other higher layer protocols that utilize IP datagrams, such as, Transmission Control Protocol ("TCP"), Hypertext Transfer Protocol ("HTTP"), Simple Object Access Protocol ("SOAP"), etc.) over the network.

Load balancer 103 attempts to balance the load between computer systems that provide service 104. Load balancer 103 can include any of a variety of different types of load balancing algorithms, such as, for example, round robin or algorithms that take the loads of computer systems into consideration. In some embodiments, load balancer 103 attempts to send related messages to the same computer system based on session ID or client IP address.

Computer systems providing service 104 can be grouped together, for example, in a server farm. Each computer system providing service 104 can include a visible endpoint that is visible to client computer systems. For example, computer system 101 includes visible endpoint 121 and computer system 102 includes visible endpoint 122. Visible endpoints are connected to a message redirector that is configured to intercept messages directed to service 104. For example, computer system 101 includes message redirector 111 configured to intercept messages directed to service 104A. Computer system 102 includes message redirector 112 configured to intercept messages directed to service 104B. An internal intercept module or intercept logic within a message redirector can be configured to facilitate message interception.

Endpoints can be described using a description language, such as, for example, Web Service Description Language ("WSDL"). Services can be described as a set of endpoints for operating on messages. Messages and operations can be described abstractly, and then bound to a concrete network protocol and message format to define an endpoint. For example, client messages and corresponding replies can be bound to SOAP messages containing eXstensible MarkUp Language ("XML") instructions.

Message redirectors are also configured to send received client messages to a corresponding service. Message redirectors can include redirect client endpoints that send received client messages to a corresponding service. For example, message redirector 111 includes redirect client endpoint 141 and message redirector 112 includes redirect client endpoint 141. Redirect client endpoints can send a message to a service at the same computer system or can redirect a message to a service at a different computer system. Address information within messages can be altered to redirect messages between hosts. For example, message redirector 111 can use redirect client endpoint 141 can send a client message to service 104A or redirect a client message to another computer system, such as, for example, computer system 102. Similarly, message redirector 112 can use redirect client endpoint 142 can send a client message to service 104B or redirect a client message to another computer system, such as, for example, computer system 101.

Message redirectors can include additional end points to receive and forward redirected client messages. Message redirectors can include a redirect service endpoint to receive redirected client messages from other computer systems. Message redirectors can also include an internal redirect client endpoint to forward client messages to a service. For example, message redirector 111 includes redirect service endpoint 131 to receive redirected client messages and internal redirect client endpoint 151 to forward redirected client messages to service 104A. Similarly, message redirector 112 includes redirect service endpoint 132 to receive redirected client messages and internal redirect client endpoint 152 to forward redirected client messages to service 104B.

In some embodiments, message redirectors are automatically provisioned. When a service (e.g., 104A) is activated, a message redirector (e.g., 1111) can automatically be added at runtime. To facilitate automated provisioning, endpoints of the service (e.g., visible endpoint 121) are moved to the message redirector. The contract for these endpoints is modified to use the appropriate generic contract for the message redirector. New endpoints (e.g., internal service client endpoint 161) are added to the service. The address and bindings of the new endpoints are changed automatically since these endpoints are to receive messages from the message redirector and are not actually visible to clients of the service. Additional endpoints for receiving messages that have been redirected are then added to the service. Automated provisioning can simplify the scale out of workflow applications using a message redirector.

Thus generally, services include an internal service client input for communication with message redirectors. For example, service 104A includes internal service client endpoint 161 for communicating with message redirector 111. Similarly, service 104B includes internal service client endpoint 162 for communicating with message redirector 112.

Visible endpoints and redirect service endpoints can differ in configurations. Visible endpoints can be configured for compatibility with client protocols can message formats. For example, visible endpoints 121 and 122 can be configured for compatibility with protocols and messages formats used by client 191. On the other hand, redirect service endpoints can be configured for compatibility with protocols and message formats used by redirect client endpoints at other message redirectors. For example, redirect service endpoint 132 can be configured for compatibility with protocols and message formats used by redirect client endpoints at other message redirectors (e.g., redirect client endpoint 141). As such, redirect service endpoints can be configured to support request/reply protocols when visible end points support one way protocols.

Shared database 106 is configured to store data, such as, for example, state data, for workflow instances providing service 104. Shared database 106 is shared among computer systems that provide service 104, including computer systems 101 and 102. Thus, data stored in shared database 106 by one computer system providing service 104 can subsequently be accessed by any other computer system providing service 104. Shared database 106 can also maintain lock information 107. Lock information 107 can contain one or more lock entries that map a workflow instance to a redirect service endpoint.

As depicted in computer architecture 100, message redirectors 111 and 112 are depicted as separate intermediary components. However, embodiments of the invention also include an arrangement where a component responsible for redirection is included in a channel stack (communication stack) on a visible endpoint directly attached to the service. In these embodiments, the channel stack for the visible public endpoint includes a pull based API, for example, channel. Receive( ). The channel stack provides sufficient abstraction such that redirection can be facilitated inside the layered channel attached to the channel stack.

Figure 2:
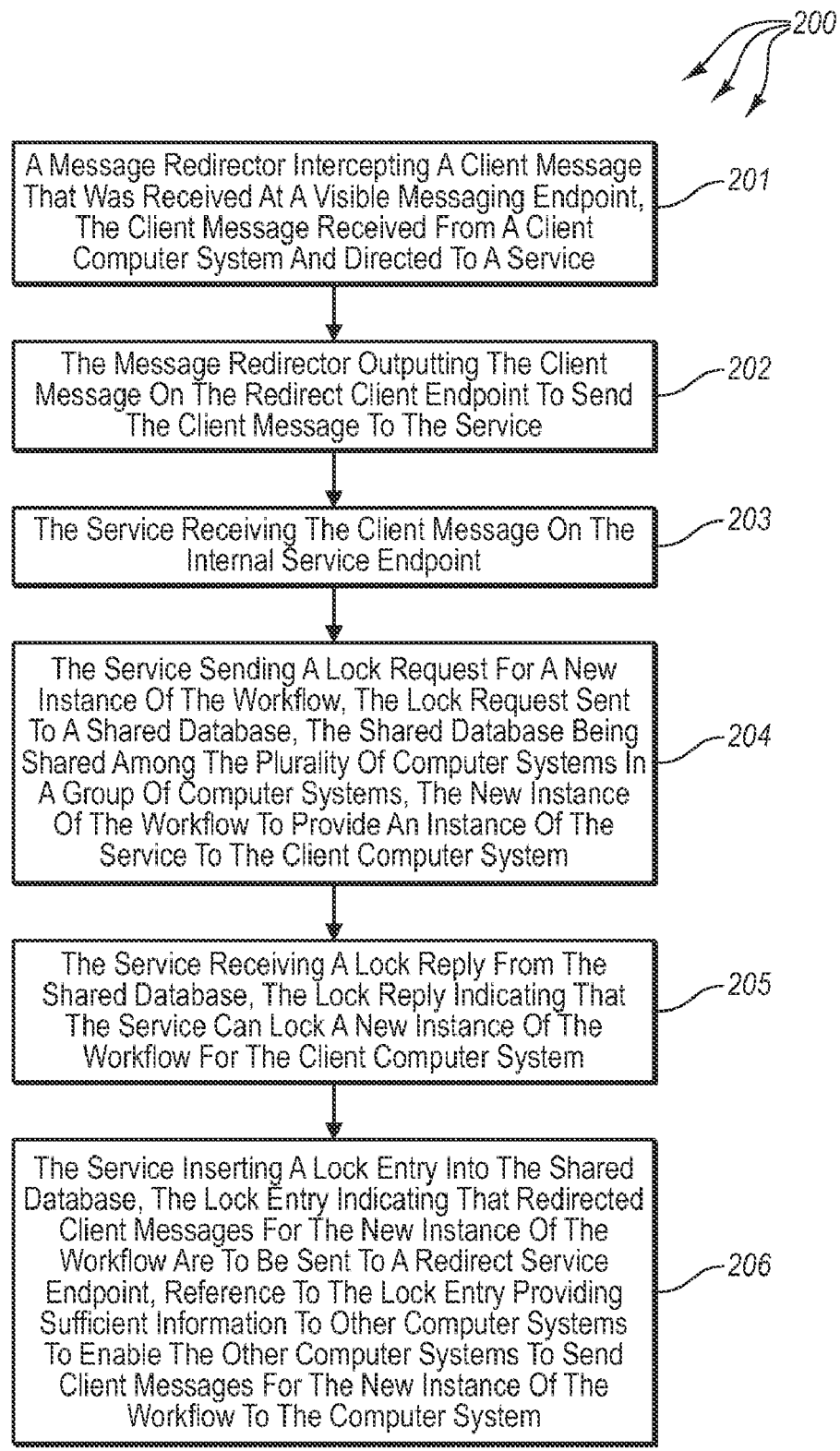
FIG. 2 illustrates a flow chart of an example method for storing endpoint information for a lock owner of an instance of a workflow.

In some embodiments, when a service receives a (e.g., initial) message from a client, the service can lock subsequent client messages for the service to a particular workflow instance. FIG. 2 illustrates a flow chart of an example method 200 for storing endpoint information for a lock owner of an instance of the workflow. Method 200 will be described with respect to the components and data of computer architecture 100 in FIG. 1A.

Method 200 includes an act of a message redirector intercepting a client message that was received at the visible messaging endpoint, the client message received from a client computer system and directed to the service (act 201). For example, client 191 can send message 128 to initiate service 104. Load balancer 103 can receive message 128. Based on a load balancing algorithm, load balancer 103 can send message 128 to computer system 112. Message 128 can be received at visible endpoint 122. Message redirector 112 can intercept message 128 from visible endpoint 122.

Method 200 includes an act of the message redirector outputting the client message on the redirect client endpoint to send the client message to the service (act 202). For example, message redirector 112 can output message 128 on to redirect client endpoint 142 to send message 128 to service 104B. Method 200 includes an act of the service receiving the client message on the internal service endpoint (act 203). For example, service 104B can receive message 128 on internal service endpoint 162.

Method 200 includes an act of the service sending a lock request for a new instance of the workflow, the lock request sent to a shared database, the shared database being shared among the plurality of computer systems in the group of computer systems, the new instance of the workflow to provide an instance of the service to the client computer system (act 204). For example, service 104B can instantiate workflow instance 104B2 to provide service 104 to client 191. Server 104B can send lock request 109 to shared database 106. Lock request 109 can request that messages from client 191 for service 104 be locked to workflow instance 104B2.

Shared database 106 can receive lock request 109. Shared database 106 can scan lock information 107 to determine that there is no existing lock for messages from client 191. As such, shared database 106 can indicate that the request for messages from client 191 to be locked to workflow instance 104A2 is accepted. Shared database 106 can return lock reply 113 indicating that the lock for workflow instance 104A2 is accepted.

Method 200 includes an act of the service receiving a lock reply from the shared database, the lock reply indicating that the service can lock a new instance of the workflow for the client computer system (act 205). For example, service 104B can receive lock reply 113 from shared database 106. Lock reply 113 indicates that a lock for client 191 is to be accepted and service 104B can lock workflow instance 104B2 for client 191.

Method 200 includes an act of the service inserting a lock entry into the shared database, the lock entry indicating that redirected client messages for the new instance of the workflow are to be sent to the redirect service endpoint, reference to the lock entry providing sufficient information to other computer systems to enable the other computer systems to send client messages for the new instance of the workflow to the computer system (act 206). For example, service 104B can store lock entry 108 in lock information 107. Lock entry 108 indicates that redirected client messages for workflow instance 104B2 are to be sent to redirected service endpoint 132. Accordingly, lock entry 108 provides sufficient information to other computer systems to enable the other computer systems to send client messages (e.g., from client 191) for workflow instance 104B2 to computer system 102.

Workflow instance 104B2 can process message 128 and return reply 129. Reply 129 can include a session ID or correlation key that be used to indicate that subsequent messages are part of the same session as message 128. Service 104B can output reply 129 on internal service client endpoint 162 to send reply 139 to message redirector 112. Message redirector 112 can receive reply 139 on redirect client endpoint 142. Message redirector 112 can output the message on visible endpoint 122 to send replay 129 to client 191. Client 191 can receive reply 129 from computer system 102. Client 191 can then use the included session ID or correlation key to indicate that subsequent messages are part of the same session as message 128 and thus are also to be sent to workflow instance 104B2.

Turning briefly to FIG. 1B, computer system 101 includes cache 172. Computer system 101 can store a message in cache 172 until an indication is received that the message is processed or until the message times out.

Figure 3:
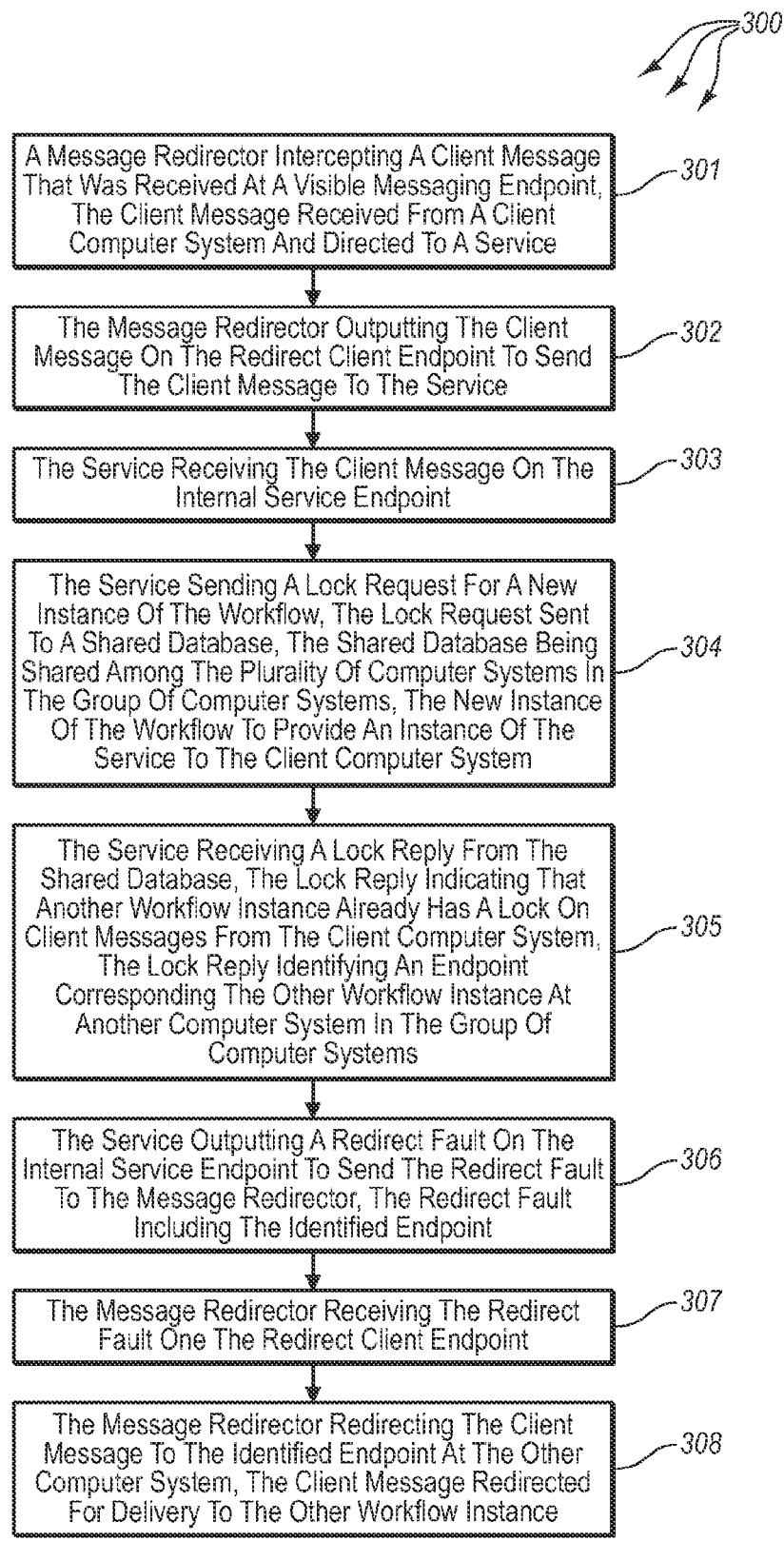
FIG. 3 illustrates a flow chart of an example method for redirecting a client message to the appropriate workflow instance.

In other embodiments, when a service receives a message from a client, the service determines that the message is already locked to an existing workflow instance. Accordingly, the message is redirected to the existing workflow instance. FIG. 3 illustrates a flow chart of an example method 300 for redirecting a client message to the appropriate workflow instance. Method 300 will be described with respect to the components and data of computer architecture 100 in FIG. 1B.

Method 300 includes an act of the message redirector intercepting a client message that was received at the visible messaging endpoint, the client message received from a client computer system and directed to the service (act 301). For example, message redirector 111 can intercept message 138 that was received at visible endpoint 121. Message 138 can be received from client 191 and directed to workflow instance 104B2. Message 138 can be related to message 128, such as, for example, message 128 and message 138 can have the same session ID or can originate from the same IP address.

Method 300 includes an act of the message redirector outputting the client message on the redirect client endpoint to send the client message to the service (act 302). For example, message redirector 111 can output message 138 on redirect client endpoint 141 to send message 138 to service 104A.

Message redirector 111 can also cache a copy of message 138 in cache 172. Message 138 can remain in cache 172 until message redirector receives an indication that message 138 was processed or until message 138 times out. The cached version of message 138 can be used to reconstruct redirected copies of message 138.

Method 300 includes an act of the service receiving the client message on the internal service endpoint (act 303). For example, service 104A can receive message 138 on internal service client endpoint 161.

Method 300 includes an act of the service sending a lock request for a new instance of the workflow, the lock request sent to a shared database, the shared database being shared among the plurality of computer systems in the group of computer systems, the new instance of the workflow to provide an instance of the service to the client computer system (act 304). For example, service 104A can send lock request 119 to shared database 106. Lock request 119 can be a request to lock messages from client 191 to a workflow instance of service 104A, such as, for example, workflow instance 104A1 or workflow instance 104A2.

Shared database 106 can receive lock request 119. Shared database 106 can scan lock information 107 to determine that messages from client 191 are already locked in workflow instance 104B2 (e.g., by locating entry 108). As such, shared database 106 can indicate that the request for messages from client 191 to be locked to a workflow instance of service 104A is rejected. Shared database 106 can return lock reply 123 indicating that the lock is rejected. Lock reply 123 also includes redirect service endpoint 132 indicating where to redirect messages from client 191.

Method 300 includes an act of receiving a lock reply from the shared database, the lock reply indicating that another workflow instance already has a lock on client messages from the client computer system, the lock reply identifying an endpoint corresponding to the other workflow instance at another computer system in the group of computer systems (act 305). For example, service 104A can receive lock replay 123, rejecting the lock request, from shared database 106. Lock reply 123 indicates that another workflow instance (i.e., workflow instance 104B2) already has a lock on messages from client 191. Lock reply 123 also identifies redirect service endpoint 132 as corresponding to the workflow instance that has the lock.

Method 300 includes an act of the service outputting a redirect fault on the internal service endpoint to send the redirect fault to the message redirector, the redirect fault including the identified endpoint (act 306). For example, service 104A can output redirect fault 133 on internal service client input 161 to send redirect fault 133 to message redirector 111. Method 300 includes an act of the message redirector receiving the redirect fault on the redirect client endpoint (act 307). For example, message redirector 111 can receive redirect fault 133 on redirect client endpoint 141.

Method 300 includes an act of the message redirector redirecting the client message to the identified endpoint at the other computer system, the client message redirected for delivery to the other workflow instance (act 308). For example, message redirector 111 can redirect message 138 to redirect service endpoint 132. Message redirector 111 can refer to cache 172 to access the cached copy of message 138. Message redirector 111 can use some or all of the cached copy of message 138 to construct the redirected copy of message 138.

Message redirector 112 can receive redirected message 138 on redirect service endpoint 132. Message redirector 112 can output redirected message 138 on internal redirect client endpoint 152 to send redirected message 138 to service 104B. Service 104B can receive redirected message 138 on internal service client endpoint 161. Service 104B can forward the message to workflow instance 104B2. Workflow instance 104B2 process message 138 to progress through workflow instance 104B2. When processing message 138, workflow instance 104B2 can refer to shared database 106 to access and/or store state data corresponding to workflow instance 104B2, such as, for example, data resulting from the processing of prior messages (e.g., message 128).

Upon processing message 138, workflow instance 104B2 can return reply 139. Service 104B can output reply 139 on internal service client endpoint 162 to send reply 139 to message redirector 112. Message redirector 112 can receive reply 139 on internal redirect client endpoint 152. Message redirector 112 can output reply 139 on redirect service endpoint 132 to send reply 139 back to message redirector 111. Message redirector 111 can receive reply 139 on redirect client endpoint 141.

Message redirector 111 can determine that reply 139 is a replay to message 138. As such, reply 139 indicates that message 138 has been processed. Thus, message redirector 111 can remove message 138 from cache 172. Message redirector outputs reply 139 on visible endpoint 121 to return reply 139 to client 191. Client 191 receives replay 139 from computer system 101.

Embodiments of the invention also include recursive message redirects. Recursive message redirects can occur when lock information changes between the time a message is redirected and when the redirected message is received at the intended recipient. Referring again to FIG. 1B, upon receiving message 138, service 104A can receive lock reply 123 rejecting a lock on messages from client 191. Service 104A can convert lock reply 123 into redirect fault 133, identifying redirect service endpoint 132 as the location to route message 138. As a result, message redirector 111 can redirect message 138 to computer system 102, which is eventually received at service 104B.

However, between the time service 104A receives lock reply 123 and the time message 138 is received at service 104B, service 104B may have released the lock on messages from client 191. Further, within the time span, computer system 153 may have obtained a lock on messages from client 191. Thus, upon receiving message 138, service 104B can send a new lock request for locking messages from client 191 to a workflow instance under its control. However, since computer system 153 has since obtained a lock for messages from client 191, a corresponding lock reply rejects the request from a lock.

Service 104 can convert the lock reply to redirect fault 171, identifying a redirect client endpoint 172 at computer system 153. Computer system 102 can return redirect fault 171, containing redirect client endpoint 172, computer system 101. Computer system 101 can then re-direct message 138 to computer system 153 (to redirect client endpoint 172). Computer system 153 can return reply 139 back to computer system 101. Recursive message redirects can continue any number of times until the service instance having the appropriate lock is located.

In some embodiments, computer systems, such as, for example, computer systems 101 and 102, are grouped together in a scale out farm. Lock information (e.g., lock information 107) is used to locate running workflow instances (e.g., workflow instance 104B2) within the scale out farm. Accordingly, messages for WCF/WF services can be redirected within the scale out farm. A new host factory can be used to create scale out hosts (e.g., message redirectors 111 and 112) that act as a delegate or shim around the service (e.g., service 104).

The scale out host controls the inner host. After constructing the inner hose, the scale host can enumerate all the endpoints of the inner host and move the address and binding of these endpoints to the scale out host. As a result, all messages to inner host pass through the scale out host. The original address and binding of the inner host are replaced by the local transport and addresses such that messages from the scale out host are sent to the inner host.

The scale out host also sets up redirect endpoints (e.g., redirect service endpoints 131 and 132). These redirect endpoints are used to receive messages redirected from other scale out hosts. Redirect endpoints are used to insure acceptance of request/reply messages or to apply a different security model to redirect endpoints. The scale out host also constructs endpoints to communicate with the inner host. These endpoints can include a custom binding that include a binding element called RedirectMessageBindingElement. This binding element enables redirect for the channel that is constructed from this binding. The RedirectMessageBindingElement accepts the binding configuration to be used to construct redirect channels.

A channel that is created from a binding stack that includes RedirectMessageBindingElement creates (a) an "inner" channel that communicates with the endpoint at the address of the inner host and (b) an "external" channel factory that can be send redirect messages to other hosts.

Accordingly, embodiments of the invention permit messages to be redirected between hosts so that messages can be delivered to the appropriate workflow instance. When a host receives a message it can refer to lock information in a shared database to determine if it is the correct host to receive the message. The lock information includes a redirect endpoint. The redirect endpoint identifies an endpoint where messages can be sent for delivery to the appropriate workflow instance. The redirect endpoint can be included in a redirect fault messages, when a host attempts to process a message that is already locked to another workflow instance. Using the redirect endpoint a host receiving a redirect fault message can be used the redirect endpoint to send the message to the correct host.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system included in a group of computer systems, each computer system in the group of computer systems configured to implement instances of a workflow representing a service such that the group of computer systems can simultaneously implement a plurality of instances of the workflow to simultaneously provide a plurality of instances of the service to other client computer systems, the computer system including a visible messaging endpoint that is visible to client computer systems, the visible endpoint configured to receive messages from client computer systems, the computer system including a message redirector, the message redirector configured to intercept messages received at the visible endpoint, the message redirector including a redirect client endpoint for sending intercepted client messages to the service, the message redirector also including a redirect service endpoint for receiving redirected client messages initially sent to other computer systems, the service including an internal service endpoint for receiving messages from the message redirector, a computer implemented method for storing endpoint information for a lock owner of an instance of the workflow, the computer implemented method comprising:

an act of the message redirector intercepting a client message that was received at the visible messaging endpoint, the client message received from a client computer system and directed to the service;

an act of the message redirector outputting the client message on the redirect client endpoint to send the client message to the service;

an act of the service receiving the client message on the internal service endpoint;

an act of the service sending a lock request for a new instance of the workflow, the lock request sent to a shared database, the shared database being shared among the plurality of computer systems in the group of computer systems, the new instance of the workflow to provide an instance of the service to the client computer system;

an act of the service receiving a lock reply from the shared database, the lock reply indicating that the service can lock a new instance of the workflow for the client computer system; and an act of the service inserting a lock entry into the shared database, the lock entry indicating that redirected client messages for the new instance of the workflow are to be sent to the redirect service endpoint, reference to the lock entry providing sufficient information to other computer systems to enable the other computer systems to send client messages for the new instance of the workflow to the computer system.

2. The method as recited in claim 1, wherein the act of the message redirector intercepting a client message comprises an act of the message redirector intercepting a SOAP message.

3. The method as recited in claim 1, further comprising:
an act of caching a copy of the client message in a cache at the computer system.

4. The method as recited in claim 1, wherein the message redirector further includes a redirect service endpoint and an internal redirect client endpoint, the redirect service endpoint configured to receive messages from and send messages to other message redirectors, the internal redirect client endpoint configured to send redirected messages to the service, the method further comprising:

an act of message redirector receiving a redirected message from another computer system in the group of computer systems, the redirected message received on the redirect service endpoint; and an act of the message redirector outputting the redirected message on the internal redirect client endpoint to send the redirected message to the service.

5. The method as recited in claim 4, wherein the act of the message redirector intercepting a client message that was received at the visible messaging endpoint comprises an act of message redirector intercepting a message that was sent using a one way protocol; and wherein the act of the message redirector receiving a redirected message from another computer system comprises an act of the message redirector receiving a message that was sent using a request/reply protocol.

6. The method as recited in claim 4, further comprising:
an act of the service receiving the redirected message on the internal service client endpoint;
an act of the service forward the redirected message to the new instance of the workflow;
an act of the new instance of the workflow processing the redirected message; and
an act of the new instance of the workflow sending a reply responsive to the redirected message.

7. The method as recited in claim 6, wherein the act of the new instance of the workflow processing the redirected message comprises an act of the new instance of the workflow referring to the shared database for stored state information.

8. The method as recited in claim 6, further comprising:
an act of the service outputting the reply on the internal service client endpoint to send the reply to the message redirector;
an act of the message redirector receiving the reply on the internal redirect client endpoint; and
an act of the message redirector outputting the reply on the redirect service endpoint to send the reply back to the other computer system.

9. The method as recited in claim 1, wherein the group of computer systems comprises a scale out farm.

10. The method as recited in claim 1, wherein the act of the service inserting a lock entry into the shared database comprises an act of inserting a lock entry that expressly maps the new instance of the workflow to the redirect service endpoint.

11. The method as recited in claim 1, wherein the act of the message redirector intercepting a client message comprises an act of the message redirector intercepting a message that was sent to the computer system from a load balancer.

12. At a computer system including one or more processors and system memory, the computer system included in a group of computer systems, each computer system in the group of computer systems configured to implement instances of a workflow representing a service such that the group of computer systems can simultaneously implement a plurality of instances of the workflow to simultaneously provide a plurality of instances of the service to other client computer systems, the computer system including a visible messaging endpoint that is visible to client computer systems, the visible endpoint configured to receive messages from client computer systems, the computer system including a message redirector, the message redirector configured to intercept messages received at the visible endpoint, the message redirector including a redirect client endpoint, the redirect client endpoint configured to: a) send intercepted client messages to the service, b) receive replies related to intercepted client messages from the service, and c) redirect client messages to other computer systems when so indicated, the service including an internal service endpoint for receiving messages from the redirect client endpoint and the internal redirect client input, a computer implemented method for redirecting a client message to the appropriate workflow instance, the computer implemented method comprising:

an act of the message redirector intercepting a client message that was received at the visible messaging endpoint, the client message received from a client computer system and directed to the service;

an act of the message redirector outputting the client message on the redirect client endpoint to send the client message to the service;

an act of the service receiving the client message on the internal service endpoint;

an act of the service sending a lock request for a new instance of the workflow, the lock request sent to a shared database, the shared database being shared among the plurality of computer systems in the group of computer systems, the new instance of the workflow to provide an instance of the service to the client computer system;

an act of receiving a lock reply from the shared database, the lock reply indicating that another workflow instance already has a lock on client messages from the client computer system, the lock reply identifying an endpoint corresponding the other workflow instance at another computer system in the group of computer systems;

an act of the service outputting a redirect fault on the internal service endpoint to send the redirect fault to the message redirector, the redirect fault including the identified endpoint;

an act of the message redirector receiving the redirect fault on the redirect client endpoint; and an act of the message redirector redirecting the client message to the identified endpoint at the other computer system, the client message redirected for delivery to the other workflow instance.

13. The method as recited in claim 12, wherein the act of the message redirector intercepting a client message comprises an act of the message redirector intercepting a SOAP message directed to the service.

14. The method as recited in claim 12, further comprising an act of caching a copy of the client message prior to outputting the client message on the redirect client endpoint.

15. The method as recited in claim 14, further comprising:
an act of receiving a reply responsive to redirected client message at the redirect client interface, the reply indicative of the redirected client message having been appropriately processed; and
an act of outputting the reply on the visible endpoint to send the reply back to the client.

16. The method as recited in claim 12, wherein the group of computer systems comprises a scale out farm.

17. The method as recited in claim 12, wherein the message redirector is included in the channel stack for a visible endpoint of the service.

18. The method as recited in claim 12, further comprising automatically provisioning the message redirector prior to redirecting the client message, including:
an act of activating the service;
an act of moving one or more of endpoints of the service to the message redirector;
an act of modifying the moved endpoints to a generic contract for the message redirector; and
an act of adding corresponding new endpoints to the service; an act of configuring the new endpoints to receive messages from the message redirector.

19. A networked system, the networked system comprising:
a load balancer;
a plurality of computer systems grouped together in a scale out farm, the plurality of computer systems each configured to provide service workflow instances of a service to client computer systems; and
a shared database, the shared database configured to store state for service workflow instances instantiated at computer systems in the plurality of computer systems and configured to store lock information for client messages that are locked to a particular service workflow instance;
wherein the load balancer implements a load balancing algorithm to determine how to balance the distribution of client messages between computer systems in the plurality of computer systems, and
wherein each computer system in the plurality of computer systems, includes:
one or more processors;
system memory, including a memory area to cache client messages directed to the service; and
one or more computer storage media having stored thereon computer-executable instructions representing a message redirector and having stored thereon computer-executable instructions representing the service, the message redirector comprising:
a connection to a visible endpoint that clients can utilize to send client messages to the service and return replies for client messages back to the clients;
an interception module configured to intercept client messages received at the visible endpoint;
a redirect client endpoint, the redirect client endpoint configured to:
a) send intercepted client messages to the service;
b) receive replies related to intercepted client messages from the service when the service processes the client message;
c) receive redirect faults from the service when the service determines that client messages are locked to a service workflow instance at another computer system in the plurality of computer systems;
d) redirect client messages to other computer systems in the plurality of computer systems in response to receiving redirect faults for client messages; and
e) receive a replies responsive to redirected client messages from other computer systems in the plurality of computer systems;
a redirect service endpoint, the redirect client endpoint configured to:
a) receive redirected client messages sent from other computer systems in the plurality of computer systems, the redirected messages being directed to a service workflow instance at the computer system; and
b) send replies to redirected client messages back to other computer systems;
an internal redirect client endpoint, the internal redirect client endpoint configured to:
a) send redirected client messages received at the redirect service endpoint to the service; and
b) receive replies for redirected client messages; and
the service comprising:
one or more workflow instances, each workflow instance providing an instance of the service;
an internal service client endpoint, the internal service client endpoint configured to:
a) receive client messages from the redirect client endpoint;
b) send replies for client messages that are processed by service workflow instances of the service to the redirect client endpoint;
c) receive redirected client messages from the internal redirect client endpoint; and
d) send replies for redirected client messages that are processed by service workflow instances of the service to the internal redirect client endpoint; and
internal logic for transferring a received client message to the appropriate workflow instance form among the one or more workflow instances;
a connection to the shared database, the connection enabling the service to access state data from the shared database and to set and access the lock information, setting lock information permitting the service to lock related client messages to a service workflow instance, accessing the lock information permitting the service to issue redirect faults for client messages that are to be redirected to other computer systems, the redirect faults indicating to the message redirector that the appropriate service workflow instance for processing the client messages is at another computer system, the redirect faults including identifiers for redirect service endpoints such that the message redirector can redirect the client messages to the appropriate service workflow instance.

20. The networked system as recited in claim 19, wherein a) service workflow instances are stateful Web services based on Windows Communication Foundation ("WCF") technologies, b) endpoints are described using Web Service Description Language ("WSDL"), and client messages and replies are SOAP messages containing eXstensible MarkUp Language ("XML") instructions.

* * * * *